(12) United States Patent
Sugiyama et al.

(10) Patent No.: US 10,239,572 B2
(45) Date of Patent: Mar. 26, 2019

(54) CONVEYANCE SEAT

(71) Applicant: TS TECH CO., LTD., Saitama (JP)

(72) Inventors: Kenji Sugiyama, Tochigi (JP);
Katsumi Kishida, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 15/897,288

(22) Filed: Feb. 15, 2018

(65) Prior Publication Data
US 2018/0229791 A1 Aug. 16, 2018

(30) Foreign Application Priority Data

Feb. 16, 2017 (JP) ................................. 2017-027214

(51) Int. Cl.
| | |
|---|---|
| *B60N 2/58* | (2006.01) |
| *B60N 2/60* | (2006.01) |
| *B62J 1/18* | (2006.01) |
| *B62J 1/12* | (2006.01) |

(52) U.S. Cl.
CPC .............. *B62J 1/18* (2013.01); *B60N 2/5825* (2013.01); *B60N 2/6027* (2013.01); *B62J 1/12* (2013.01)

(58) Field of Classification Search
CPC ...... B62J 1/18; B62J 1/20; B60N 2/58; B60N 2/60; B60N 2/6027; B60N 2/5825
See application file for complete search history.

(56) References Cited

U.S. PATENT DOCUMENTS

| | | | | | |
|---|---|---|---|---|---|
| 4,525,899 | A | * | 7/1985 | Carroll | ...................... B42F 3/00 24/545 |
| 4,564,163 | A | * | 1/1986 | Barnett | ...................... F16L 3/12 24/16 PB |
| 5,080,431 | A | * | 1/1992 | Frazier | ....................... B62J 1/20 297/184.11 |
| 5,826,312 | A | * | 10/1998 | Schroder | .............. B60N 2/5825 24/601.2 |
| 6,122,806 | A | * | 9/2000 | Umezawa | ............ B60N 2/5825 24/546 |
| 7,287,305 | B2 | * | 10/2007 | Bednarski | ............ B60N 2/5825 24/297 |

(Continued)

FOREIGN PATENT DOCUMENTS

| | | | | | |
|---|---|---|---|---|---|
| DE | 202017106324 U1 | * | 5/2018 | ............. | A47C 31/02 |
| DE | 102017202522 A1 | * | 6/2018 | ........... | A47C 31/023 |

(Continued)

*Primary Examiner* — Timothy J Brindley
(74) *Attorney, Agent, or Firm* — Typha IP LLC

(57) ABSTRACT

In a conveyance seat, a linear member can be adequately hooked on a bottom wall and a state that the linear member is hooked on the bottom wall is adequately maintained. A bottom plate is provided with a protruding part on which a suspension strap is hooked when suspending a skin material, and a position variable part capable of changing a relative position to the protruding part. The position variable part can move between a first position where it contacts or engages the protruding part and a second position where it is disengaged from the protruding part. In a state that the relative position of the position variable part with respect to the protruding part is in the first position, at least a part of the position variable part projects further outward than a side surface of the protruding part in a direction intersecting the protruding direction of the protruding part.

10 Claims, 12 Drawing Sheets

(56) References Cited

U.S. PATENT DOCUMENTS

| | | | |
|---|---|---|---|
| 7,591,511 B2* | 9/2009 | Smith | A47C 5/06 297/445.1 |
| 7,648,198 B1* | 1/2010 | Matsler | B62J 1/20 297/199 |
| 10,137,808 B2* | 11/2018 | Nagasawa | B60N 2/585 |
| 2002/0074845 A1* | 6/2002 | Perske | B60N 2/5825 297/452.6 |
| 2009/0140569 A1* | 6/2009 | Mashimo | B60N 2/5825 297/452.59 |
| 2011/0138582 A1* | 6/2011 | Ogino | B60N 2/5825 24/115 R |
| 2013/0117973 A1* | 5/2013 | Murasaki | A47C 31/023 24/581.11 |
| 2013/0119730 A1* | 5/2013 | Nakagawa | B60N 2/58 297/218.1 |
| 2015/0132422 A1* | 5/2015 | Yamada | B29C 31/008 425/3 |
| 2015/0239379 A1* | 8/2015 | Yoshida | B60N 2/5685 297/180.12 |
| 2016/0280106 A1* | 9/2016 | Sato | B60N 2/6027 |
| 2016/0311353 A1* | 10/2016 | Yasuda | B60N 2/6018 |
| 2017/0008435 A1* | 1/2017 | Murasaki | A44B 18/0076 |
| 2017/0349074 A1* | 12/2017 | Fujiwara | B60N 2/2887 |
| 2018/0208092 A1* | 7/2018 | Stephan | A47C 7/386 |
| 2018/0304782 A1* | 10/2018 | Yoshino | B60N 2/5825 |

FOREIGN PATENT DOCUMENTS

| | | | |
|---|---|---|---|
| EP | 3159211 A1 * | 4/2017 | A44B 17/0017 |
| EP | 3162525 A1 * | 5/2017 | B29C 39/10 |
| JP | S62-176087 U | 11/1987 | |

* cited by examiner

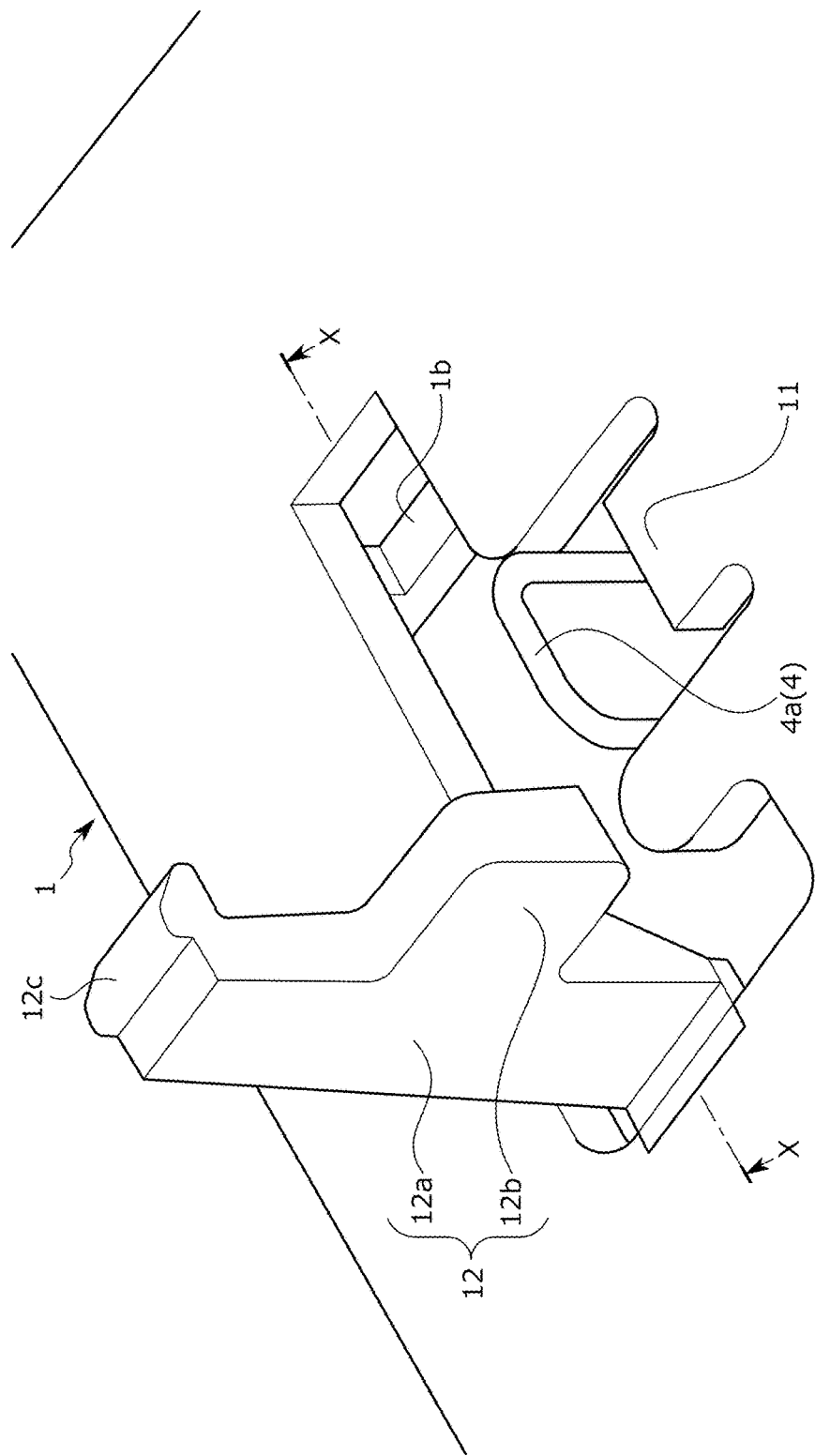

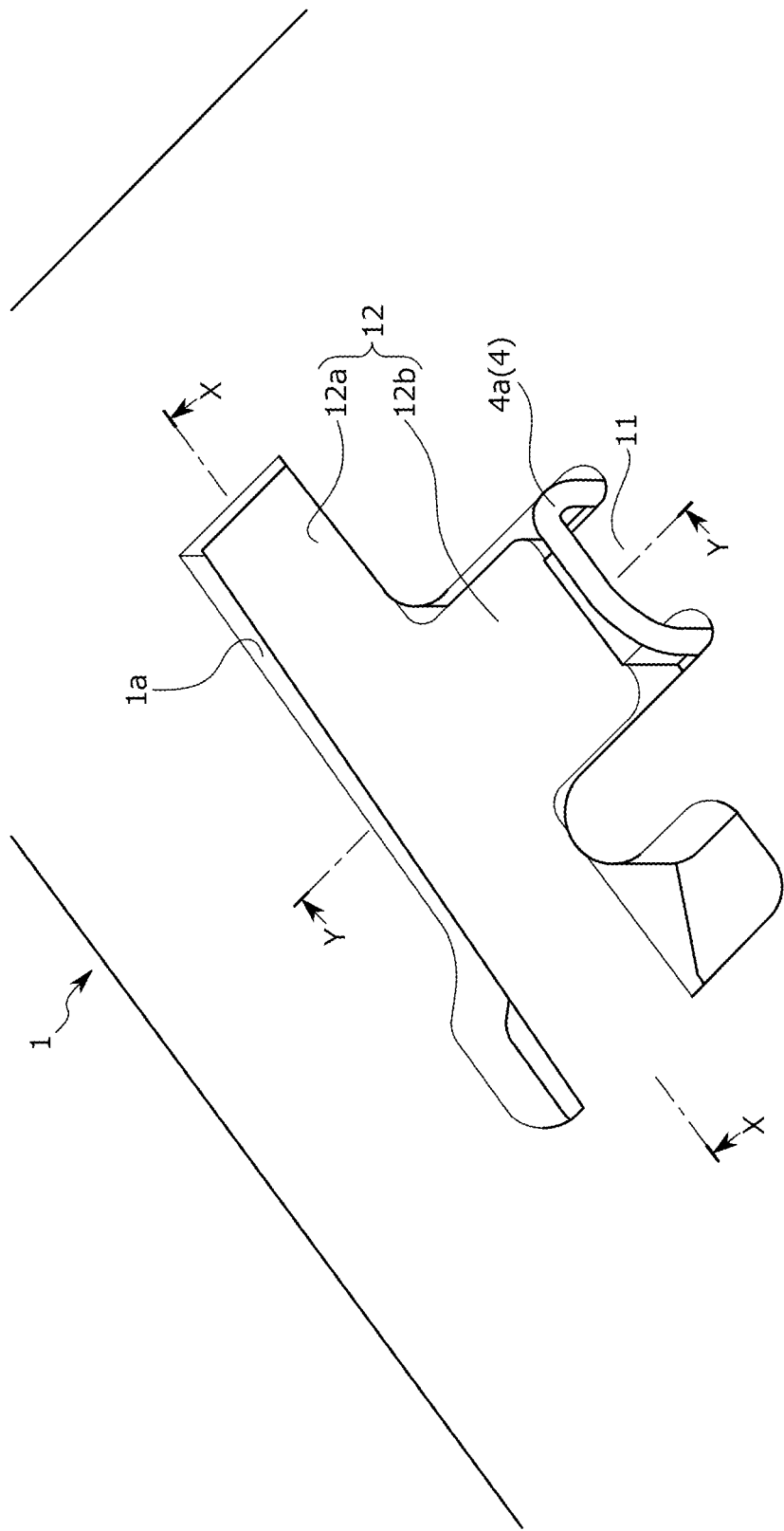

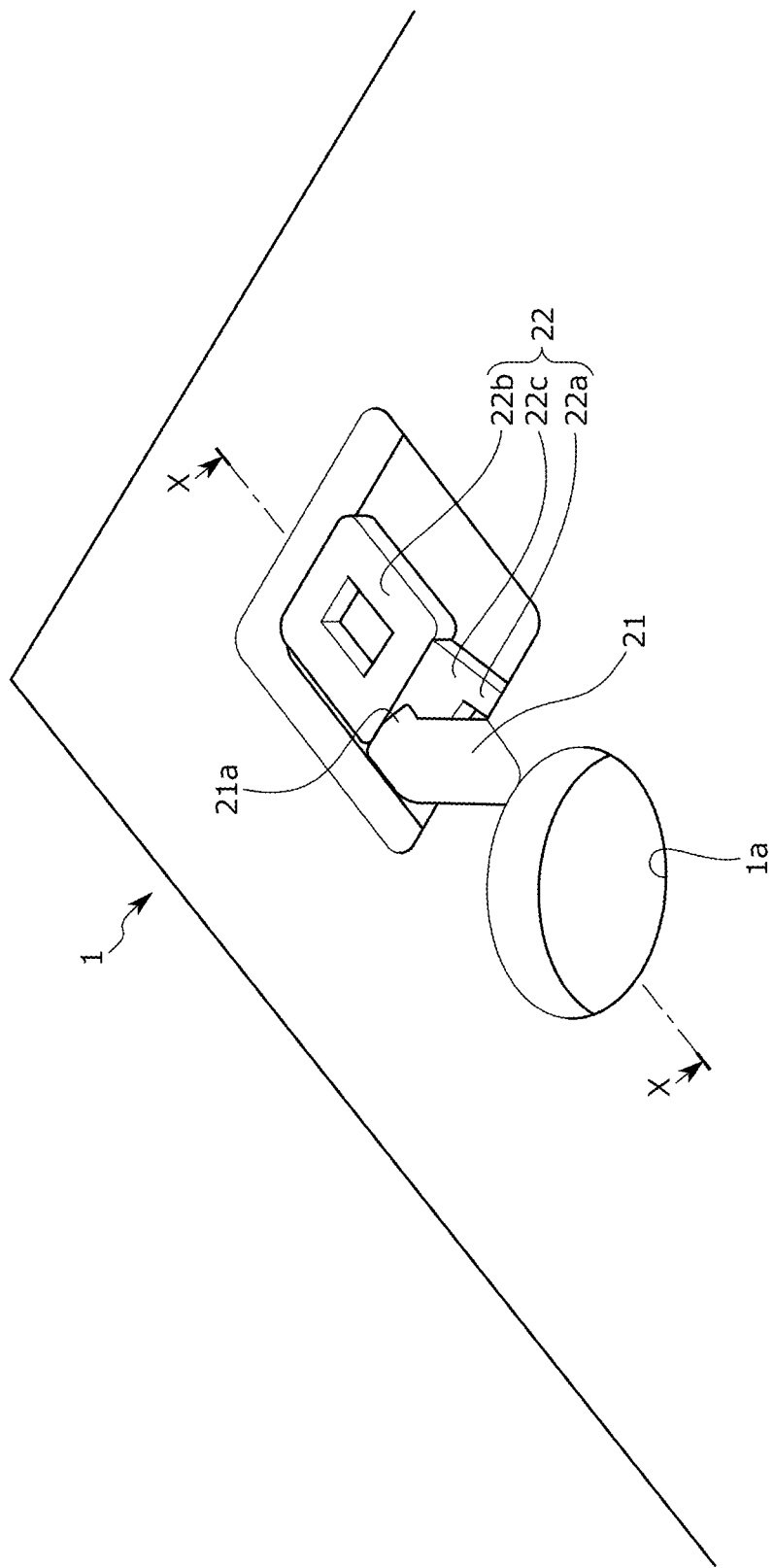

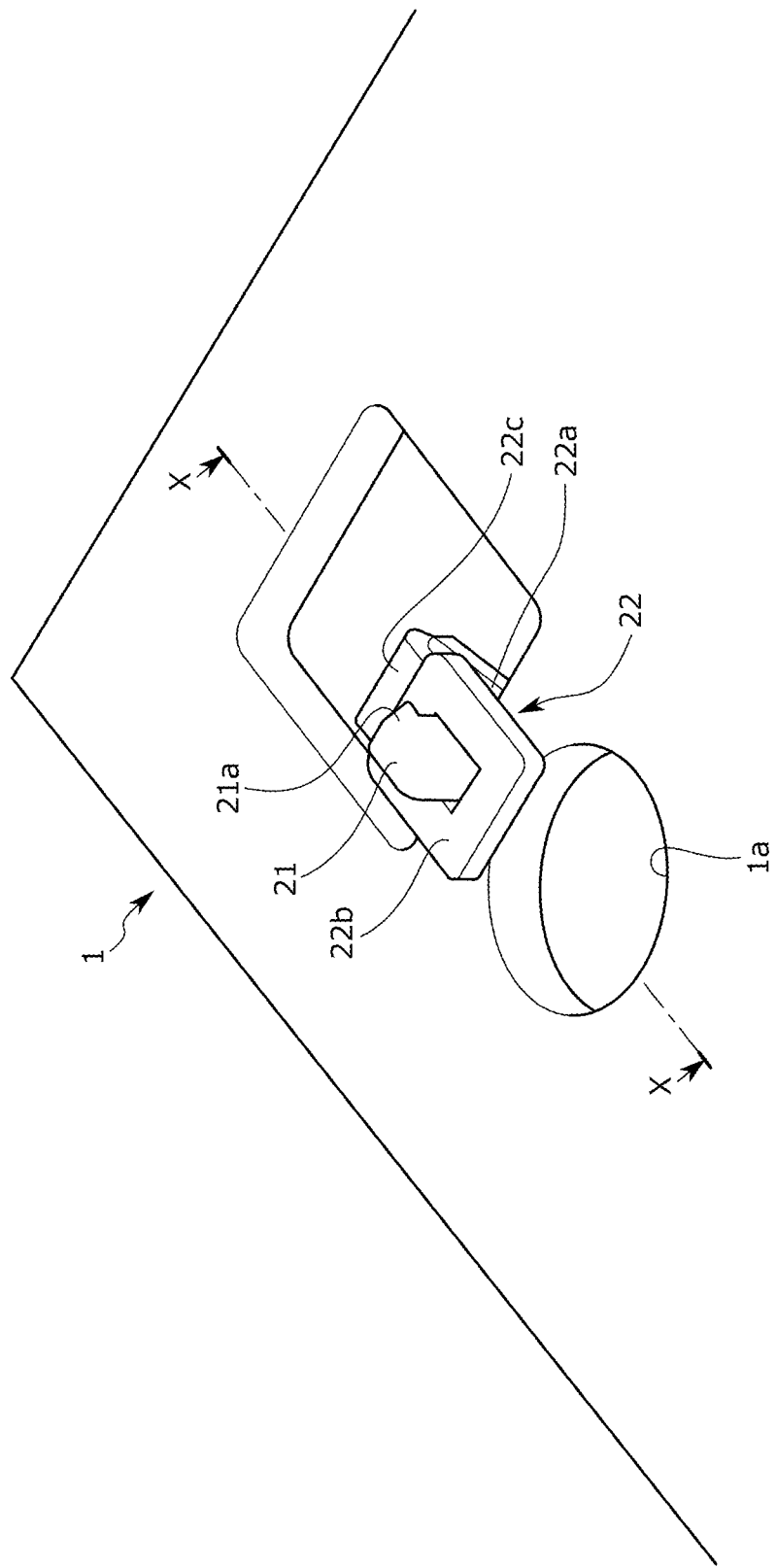

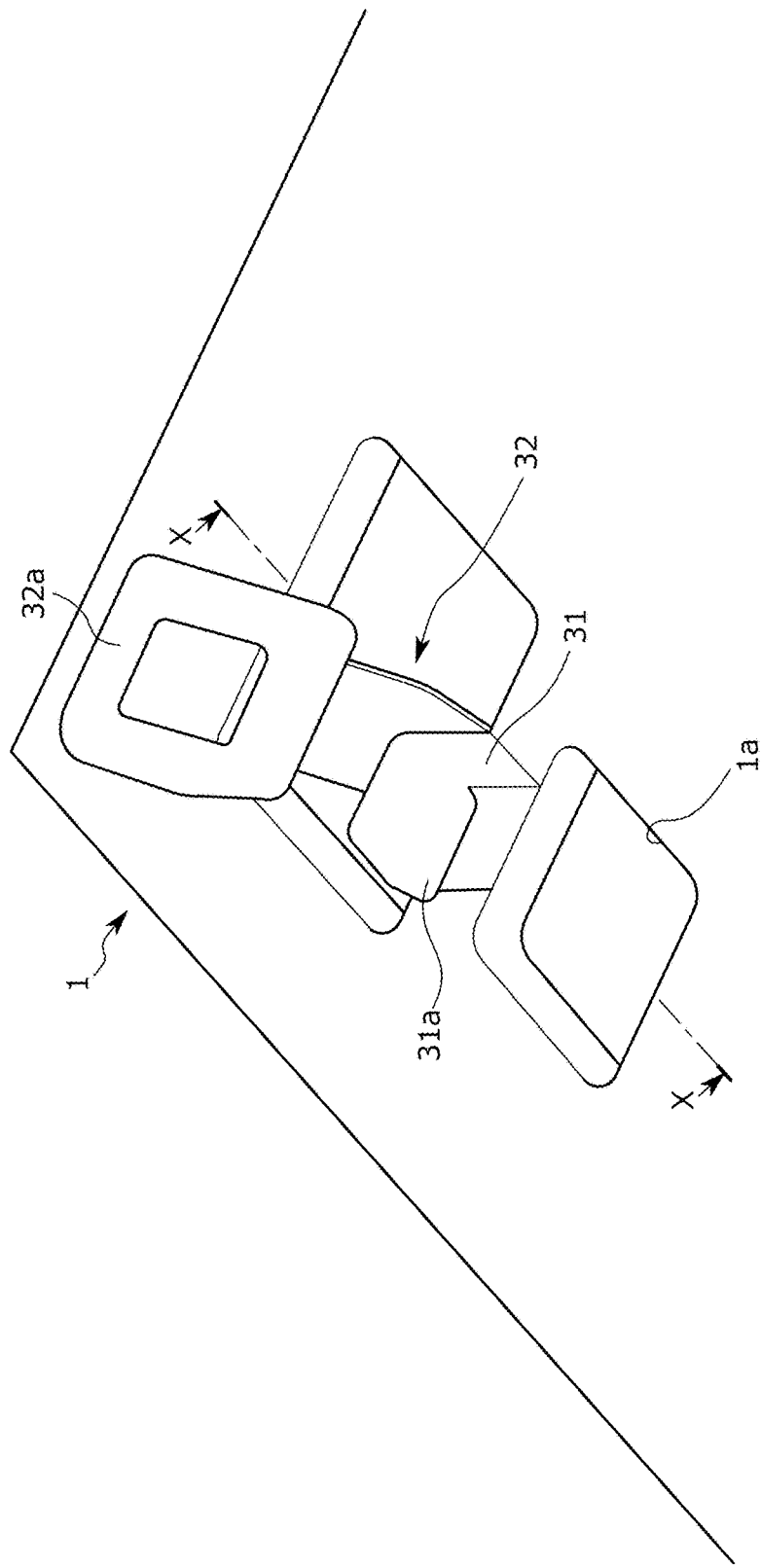

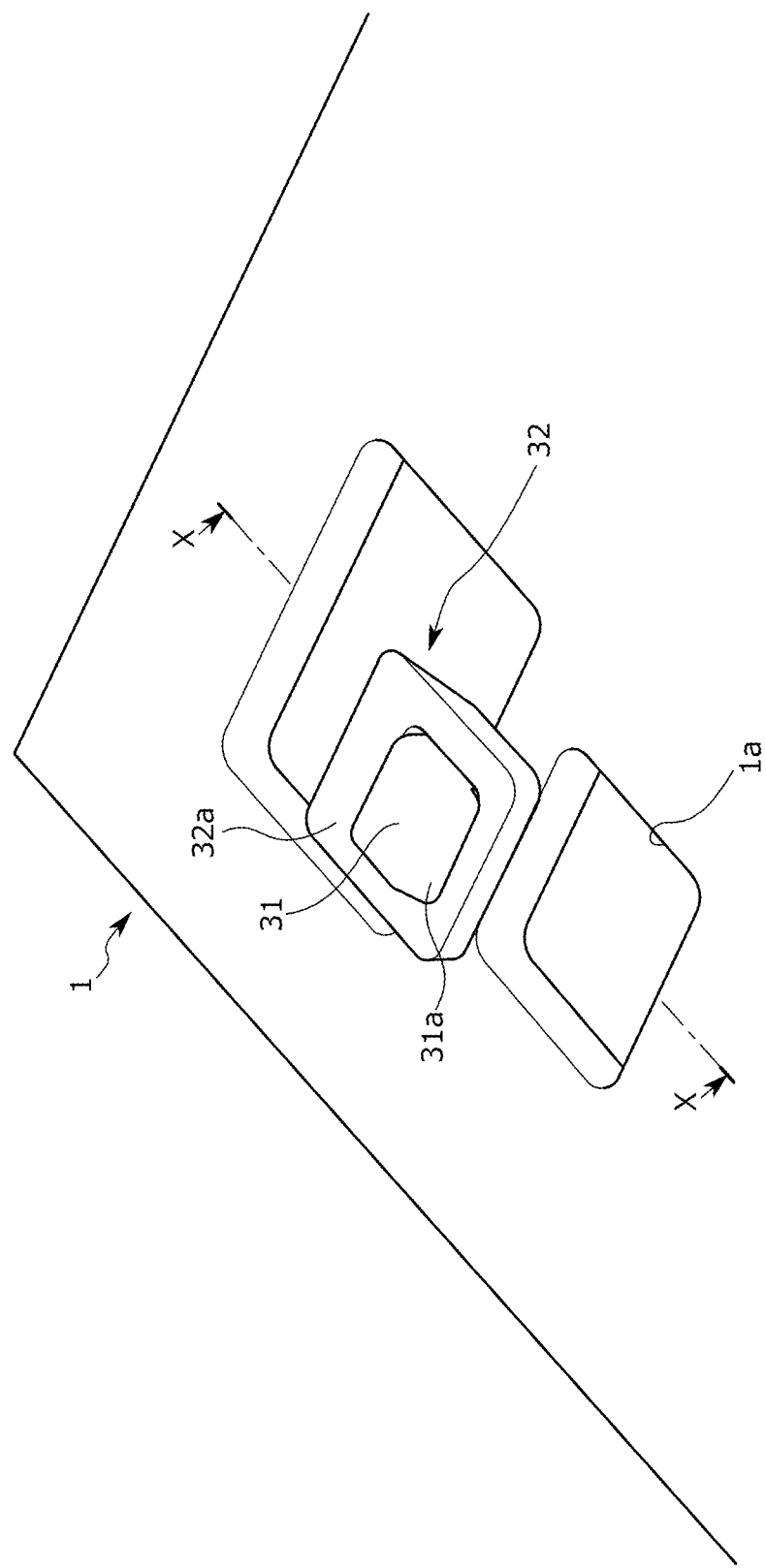

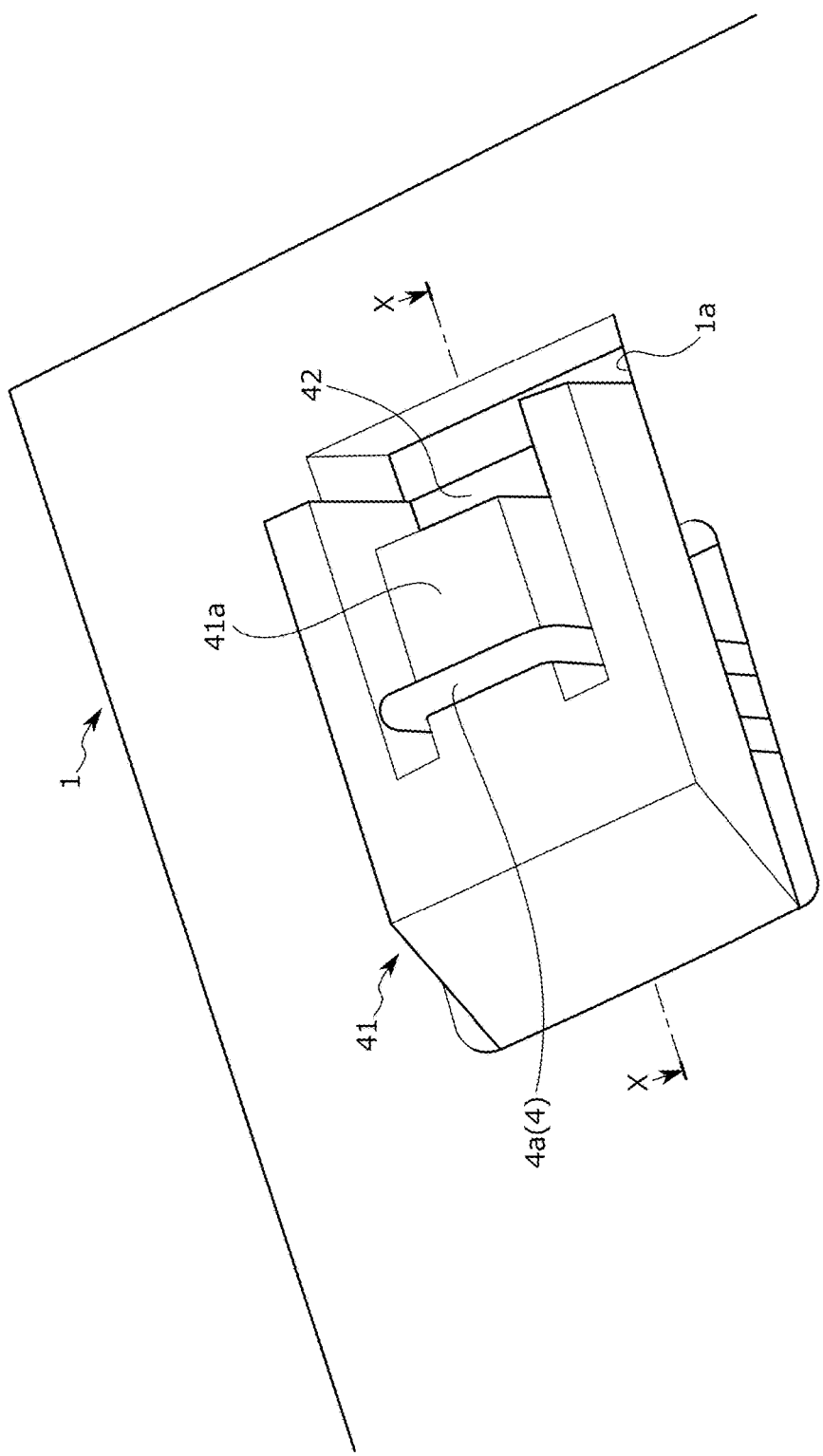

CONVEYANCE SEAT

CROSS REFERENCE TO RELATED APPLICATIONS

This application is based on and claims the benefit of priority from the prior Japanese Patent Application JP 2017-027214, filed on Feb. 16, 2017, the entire contents of which are incorporated herein by reference.

BACKGROUND OF THE INVENTION

Field of the Invention

The present invention relates to a conveyance seat, and more specifically, to a conveyance seat having a structure for hooking a linear member used for suspending a skin material which covers a cushion material on a bottom wall.

Description of the Related Art

In conveyance seats, it is already known that a cushion material which is a seat component is covered with a skin material and the skin material is suspended by a linear member such as a suspension strap. Moreover, a structure in which the linear member in a state of suspending the skin material is hooked on a bottom wall of the seat is also well known. Specifically, in a motorcycle seat described in Japanese Utility Model Laid-Open No. S62-176087 as an example, a hook part is formed by boring a hole in a bottom member which is a bottom wall, and a suspension strap is hooked on the hook part.

However, in the structure in which the linear member in a state of suspending the skin material is hooked on the bottom wall of the seat, it is of course necessary to keep the linear member from dropping off the bottom wall. That is, the state that the linear member is hooked on the bottom wall has to be successfully maintained. Meanwhile, when hooking the linear member on the bottom wall, it is necessary to adequately hook it thereon.

SUMMARY OF THE INVENTION

Therefore, the present invention has been made in view of the above-described problems, and an object thereof is to provide a conveyance seat in which a linear member can be adequately hooked on a bottom wall and a state that the linear member is hooked on the bottom wall can be adequately maintained.

According to a conveyance seat of the present invention, the problems are solved by the conveyance seat having a cushion material, a bottom wall which supports the cushion material, a skin material which covers the cushion material, and a linear member used for suspending the skin material, in which the bottom wall is provided with a protruding part on which the linear member is hooked when suspending the skin material, and a position variable part capable of changing a relative position with respect to the protruding part, and the relative position can be changed between a first position where the position variable part contacts or engages the protruding part and a second position where the position variable part is disengaged from the protruding part.

In the conveyance seat of the present invention configured as described above, the protruding part and the position variable part are provided on the bottom wall. On the protruding part, the linear member is hooked when suspending the skin material. The relative position of the position variable part with respect to the protruding part is changed between the first position where the position variable part contacts or engages the protruding part and the second position where the position variable part is disengaged from the protruding part. Here, in a state that the position variable part is in the second position, the position variable part is disengaged from the protruding part. Since the linear member is hooked on the protruding part in such a state, it is possible to adequately hook the linear member thereon while suppressing interference of the linear member and the position variable part. Moreover, when the position variable part is in the first position, the position variable part can regulate the linear member hooked on the protruding part from disengaging from the protruding part. Thereby, the state that the linear member is hooked on the protruding part is adequately maintained.

Moreover, in the above-described configuration, in a state that the relative position is in the first position, at least a part of the position variable part may project further outward than a side surface of the protruding part in a direction intersecting the protruding direction of the protruding part.

In the above-described configuration, when the relative position is in the first position, at least a part of the position variable part projects further outward than the side surface of the protruding part in the direction intersecting the protruding direction of the protruding part. In this manner, a portion projecting further outward than the side surface of the protruding part is provided in the position variable part, and therefore, it is possible to avoid the linear member hooked on the protruding part from dropping out of the protruding part and to successfully maintain the state that the linear member is hooked on the protruding part.

Moreover, in the above-described configuration, preferably, a hole is provided in the bottom wall and the protruding part is situated inside the hole, and a part of an edge of the hole forms an edge of the protruding part.

In the above-described configuration, since the surrounding of the protruding part is a space (hole), the linear member is easily hooked on the protruding part.

Moreover, specifically as a preferred configuration as to the conveyance seat of the present invention, preferably, the shape of the hole is a shape engageable with the position variable part when the relative position is in the first position, and the position variable part is adjacent to the protruding part in a state that an edge of the position variable part is situated inside the edge of the hole when the relative position is in the first position.

In the above-described configuration, when the relative position is in the first position, the position variable part engages with the hole and fits inside the hole. Therefore, it is possible to make the structure for suspending the skin material more compact. Moreover, the position variable part fits inside the hole, thereby being adjacent to the protruding part situated inside the hole. Thereby, the position variable part contacts the protruding part when the relative position is in the first position. As a result, the position variable part can successfully maintain the state that the linear member is hooked on the protruding part.

Moreover, specifically as a preferred configuration as to the conveyance seat of the present invention, preferably, a tip portion of the position variable part is provided with a claw-shaped engagement part, the bottom wall is provided with an engaged part at a position adjacent to the hole, and when the relative position is in the first position, the engagement part enters the hole and engages with the engaged part.

In the above-described configuration, the tip portion of the position variable part is provided with the claw-shaped engagement part, and the bottom wall is provided with the engaged part at the position adjacent to the hole. Then, when the relative position is in the first position, the engagement part enters a part of the hole and engages with the engaged part. Thereby, the position variable part is easily held in the first position. As a result, the state that the linear member is hooked on the protruding part is easily maintained.

Moreover, specifically as a preferred configuration as to the conveyance seat of the present invention, preferably, the position variable part has a first extension part which extends linearly and a second extension part which extends in a direction intersecting the first extension part, and can rotate with one end portion of the first extension part in the extending direction of the first extension part as a fulcrum, and when the position variable part is in the first position, a free end of the second extension part is adjacent to a free end of the protruding part.

In the above-described configuration, the position variable part has a generally T shape. Since the position variable part has such a shape, the position variable part in a state of being in the first position (in other words, inside the hole) is difficult to come out of the hole. Thereby, the position variable part is easily held in the first position. As a result, the state that the linear member is hooked on the protruding part is easily maintained.

Moreover, specifically as a preferred configuration as to the conveyance seat of the present invention, preferably, the hole has a first opening which is in a position closer to the cushion material and a second opening further away from the cushion material, the position variable part has a surface which faces the second opening when the position variable part is in the first position, and the surface is situated between the first opening and the second opening when the relative position is in the first position.

In the above-described configuration, since the surface of the position variable part is situated on the back side (the side where the first opening is situated) than the second opening, it is possible to make the size of the bottom wall more compact compared to the configuration in which the surface of the position variable part comes out of the hole through the second opening. Moreover, since the surface of the position variable part is situated on the back side, it is possible to avoid the situation where the position variable part accidentally comes out of the hole and to suppress the relative position of the position variable part with respect to the protruding part from deviating from the first position.

Moreover, specifically as a preferred configuration as to the conveyance seat of the present invention, preferably, the position variable part has a mating part which fits into the protruding part when the relative position is in the first position, and a tip portion of the protruding part is provided with a claw-shaped protrusion which protrudes outside an inner edge of the mating part in a state that the mating part fits into the protruding part.

In the above-described configuration, the position variable part has the mating part which fits into the protruding part, and the tip portion of the protruding part is provided with the claw-shaped protrusion which protrudes outside the inner edge of the mating part in a state that the mating part fits into the protruding part. Thereby, it is possible to maintain the state that the mating part fits into the protruding part, that is, the state that the relative position of the position variable part with respect to the protruding part is in the first position. Thereby, it is possible to successfully maintain the state that the linear member is hooked on the protruding part.

Moreover, specifically as a preferred configuration as to the conveyance seat of the present invention, preferably, the bottom wall is a resin molded article, the position variable part has a base end part, the mating part, and a bent part which connects the base end part and the mating part and is capable of being bent, and is moved toward the first position from the second position by bending the bent part, and of the base end part, a through hole is provided in a portion opposed to the protrusion.

In the above-described configuration, the bent part of the position variable part is bent, thereby the position variable part is moved toward the first position from the second position. Thereby, the relative position of the position variable part with respect to the protruding part can be easily changed.

Moreover, of the base end part of the position variable part, in the portion opposed to the protrusion formed on the protruding part, the through hole is provided. According to such a configuration, when the bottom wall is molded in a die, the portion opposed to the protrusion of the protruding part is molded so as to be the through hole, therefore it is possible to mold the bottom wall having the above-described protrusion by using a die of a relatively simple configuration.

Moreover, specifically as a preferred configuration as to the conveyance seat of the present invention, preferably, the linear member is a suspension strap whose tip portion is ring-shaped, and on the protruding part, the tip portion of the suspension strap is hooked.

In the above-described configuration, the suspension strap is used as the linear member, and on the protruding part, the ring-shaped tip portion of the suspension strap is hooked. According to such a configuration, the suspension strap is easily hooked on the protruding part.

According to the conveyance seat of the present invention, the linear member in a state of suspending the skin material can be adequately hooked on the protruding part of the bottom wall, and it is possible to successfully maintain the state that the linear member is hooked on the protruding part.

Moreover, according to the conveyance seat of the present invention, since the portion which projects further outward than the side surface of the protruding part in the position variable part prevents the linear member hooked on the protruding part from dropping out of the protruding part, it is possible to successfully maintain the state that the linear member is hooked on the protruding part.

Moreover, according to the conveyance seat of the present invention, since the surrounding of the protruding part is a space (hole), the linear member is easily hooked on the protruding part.

Moreover, according to the conveyance seat of the present invention, it is possible to make the structure for suspending the skin material more compact, and to successfully maintain the state that the linear member is hooked on the protruding part.

Moreover, according to the conveyance seat of the present invention, the relative position of the position variable part with respect to the protruding part is easily held in the first position, and consequently, the state that the linear member is hooked on the protruding part is easily maintained.

Moreover, according to the conveyance seat of the present invention, since the position variable part has a generally T shape, the position variable part in a state of being in the first position (in other words, inside the hole) is difficult to come out of the hole. As a result, the state that the linear member is hooked on the protruding part is easily maintained.

Moreover, according to the conveyance seat of the present invention, it is possible to make the size of the bottom wall more compact compared to the configuration in which the surface of the position variable part comes out of the hole through the first opening. Moreover, it is possible to avoid the situation where the position variable part accidentally comes out of the hole.

Moreover, according to the conveyance seat of the present invention, since the state that the mating part of the position variable part fits into the protruding part is adequately maintained, it is possible to more successfully maintain the state that the linear member is hooked on the protruding part.

Moreover, according to the conveyance seat of the present invention, the relative position of the position variable part with respect to the protruding part can be easily changed. Moreover, when the bottom wall provided with the claw-shaped protrusion on the protruding part is molded in a die, it is possible to mold the bottom wall by using a die of a relatively simple configuration.

Moreover, according to the conveyance seat of the present invention, by using, as the linear member, the suspension strap whose tip portion is ring-shaped, the suspension strap is easily hooked on the protruding part.

BRIEF DESCRIPTION OF THE DRAWING

FIG. 3A shows a first example of a structure for hooking a suspension strap (No. 1).

FIG. 3B shows the first example of the structure for hooking the suspension strap (No. 2).

FIG. 5A shows a second example of the structure for hooking the suspension strap (No. 1).

FIG. 5B shows the second example of the structure for hooking the suspension strap (No. 2).

FIG. 7A shows a third example of the structure for hooking the suspension strap (No. 1).

FIG. 7B shows the third example of the structure for hooking the suspension strap (No. 2).

FIG. 9 shows a fourth example of the structure for hooking the suspension strap.

DETAILED DESCRIPTION

Hereinafter, a conveyance seat of the present invention will be described with reference to a plurality of embodiments (a first example—a fourth example). However, the following embodiments are for facilitating understanding of the present invention, and do not intend to limit the present invention. That is, as a matter of course, the present invention can be changed and improved without departing from the gist thereof, and equivalents thereof are included in the present invention.

It should be noted that, in the following, the conveyance seat will be described with reference to a motorcycle seat (hereinafter, a sitting seat S) as an example. However, the conveyance seat of the present invention is not limited to the motorcycle seat, and is also applicable to seats mounted on conveyances (for example, automobiles, aircrafts, and ships) other than motorcycles.

Moreover, the state and the position of each part of the seat described below are those when a motorcycle on which the sitting seat S is mounted stands upright with respect to a horizontal plane, unless otherwise noted. By the way, in the following description, a "front to back direction" refers to a front to back direction of the sitting seat S (strictly, a front to back direction viewed from an occupant sitting on the sitting seat S). Moreover, a "seat width direction" refers to a width direction of the sitting seat S and is a direction corresponding to a right and left direction viewed from the occupant sitting on the sitting seat S. Moreover, an "up and down direction" refers to a height direction of the motorcycle on which the sitting seat S is mounted, and is a direction corresponding to a thickness direction of a bottom plate 1 described later.

<<Basic Configuration of Sitting Seat>>

The sitting seats S according to the respective embodiments are common in regard to a basic configuration except a structure for hooking a suspension strap. Thus, when explaining the respective embodiments, the basic configuration of the sitting seat S will be described with reference to FIG. 1 and FIG. 2. By the way, FIG. 2 shows a section of the sitting seat S according to a first example as a representative example of the plurality of embodiments.

Figure 1:
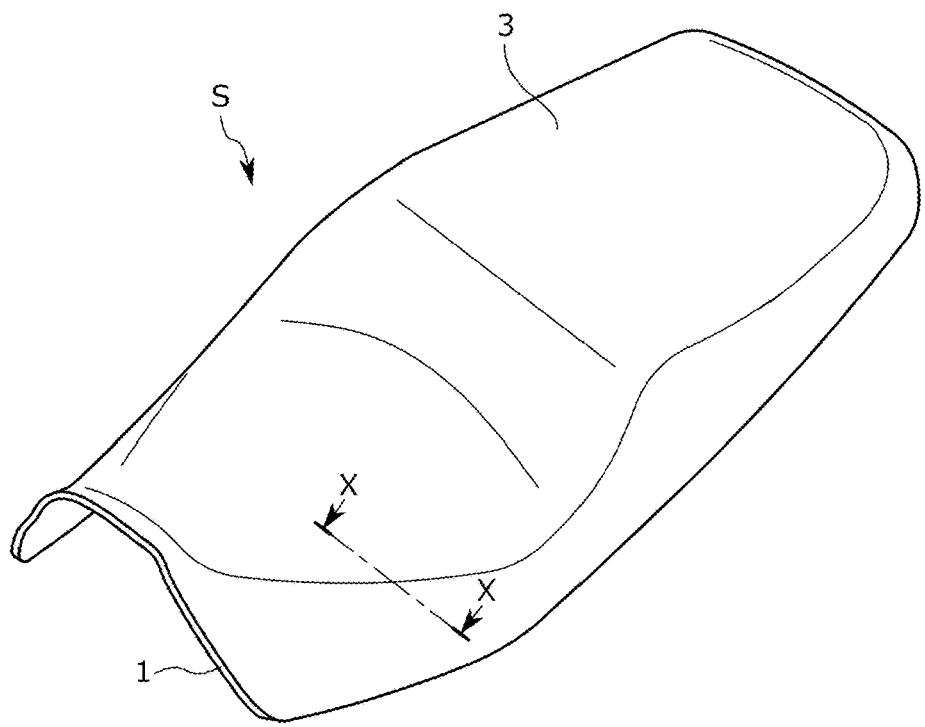
FIG. 1 shows an appearance of a conveyance seat according to one embodiment of the present invention.
Figure 2:
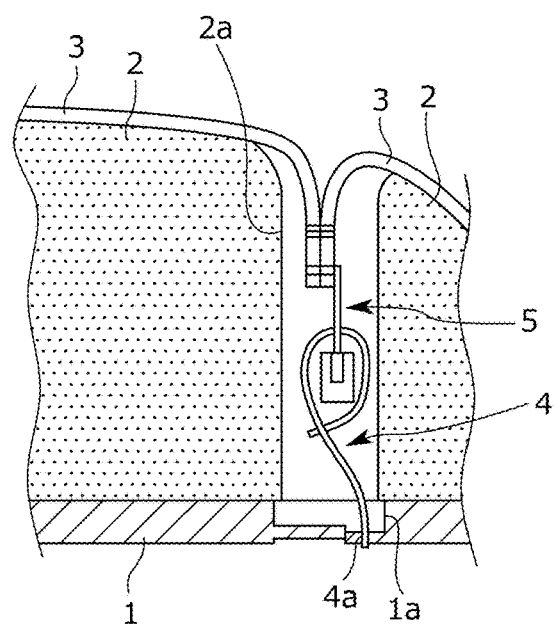
FIG. 2 shows an X-X section of FIG. 1.

The sitting seat S is a saddle-shaped seat having an appearance shown in FIG. 1. The basic configuration of the sitting seat S except the structure for hooking the suspension strap is similar to that of a general motorcycle seat. Specifically, as shown in FIG. 2, the sitting seat S has, as components, a bottom plate 1 made up of a resin molded article, a cushion material 2 made up of a foam material such as urethane foam, and a skin material 3 made up of a leather material such as vinyl leather. The bottom plate 1 corresponds to a bottom wall, and supports the cushion material 2 by putting the cushion material 2 thereon. In addition, the bottom plate 1 is formed by pouring resin into a die (not shown) of a predetermined shape.

The skin material 3 is stretched so as to cover the cushion material 2. Moreover, as shown in FIG. 2, apart of the skin material 3 is suspended in a suspension groove 2a formed in the cushion material 2. Concretely, as shown in the same figure, in the sitting seat S, a portion where the skin material 3 is overlapped exists, and in that portion, both end portions of the skin material 3 are crimped. The crimped end portion of the skin material 3 is suspended in the suspension groove 2a passing through the cushion material 2 in the up and down direction. Moreover, on the crimped end portion of the skin material 3, a strap-shaped relay member 5 is sewed up. The relay member 5 is a strap-shaped or band-shaped member used for suspending the skin material 3 in the suspension groove 2a, and is composed of a trim cord or a mesh suspender.

Moreover, to a lower end portion of the relay member 5, a distal end portion of the suspension strap 4 is attached. The suspension strap 4 is a linear member used for suspending the skin material 3 in the suspension groove 2a. The suspension strap 4 is pulled downward when suspending the crimped end portion of the skin material 3. Moreover, a tip portion 4a (an end portion opposite to the side which is attached to the relay member 5) of the suspension strap 4 is ring-shaped, that is, loop-shaped.

Moreover, in a portion situated in the immediately under position of the suspension groove 2a in the bottom plate 1, as shown in FIG. 2, a hole 1a passing through the bottom plate 1 is provided. The loop-shaped tip portion 4a of the suspension strap 4 is put through the hole 1a, and is hooked on a predetermined point (concretely, a protruding part 11, 21, 31, or 41) of the bottom plate 1.

First Example

Figure 4A:
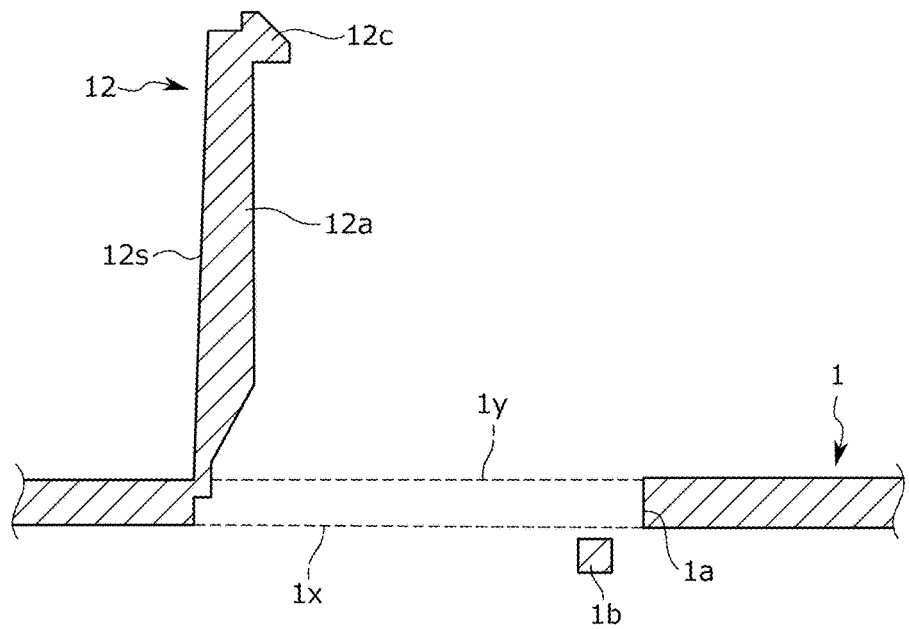
FIG. 4A shows an X-X section of FIG. 3A.
Figure 4B:
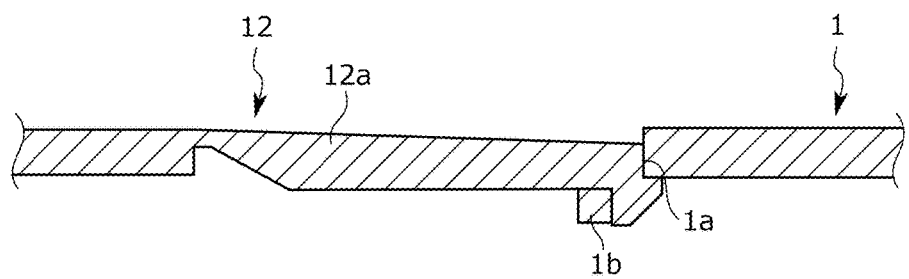
FIG. 4B shows an X-X section of FIG. 3B.
Figure 4C:
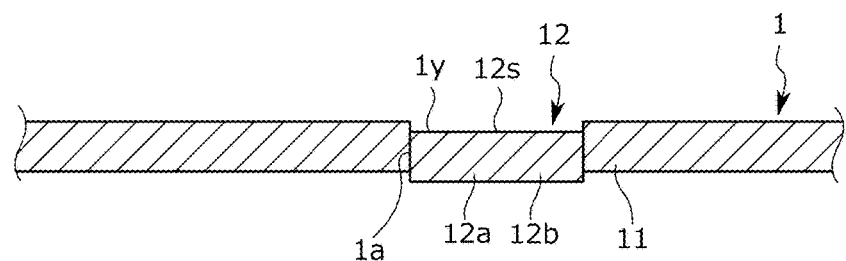
FIG. 4C shows a Y-Y section of FIG. 3B.

Next, the first example of the structure for hooking the suspension strap 4 will be described with reference to FIG. 3A, FIG. 3B, and FIG. 4A to FIG. 4C. In addition, FIG. 3A and FIG. 3B show the protruding part 11 and the position variable part 12 viewed from a lower side of the bottom plate 1. FIG. 4A shows an X-X section of FIG. 3A, FIG. 4B shows an X-X section of FIG. 3B, and FIG. 4C shows a Y-Y section of FIG. 3B.

In the first example, in the bottom plate 1, as the hole 1a for putting the tip portion 4a of the suspension strap 4 therethrough, a generally F-shaped hole in plan view shown in FIG. 3A is formed. Then, as shown in FIG. 3A, an edge of the hole 1a is provided with a convex-shaped protruding part 11 and a generally T-shaped position variable part 12. The protruding part 11 and the position variable part 12 are provided on the bottom plate 1, and are molded integrally with a body portion (a portion except the protruding part 11 and the position variable part 12) of the bottom plate 1 when molding the bottom plate 1.

The protruding part 11 is a portion on which the tip portion 4a of the suspension strap 4 is hooked when suspending the skin material 3, and protrudes in a direction intersecting the up and down direction in the first example. More specifically, in the first example, the protruding part 11 is situated inside the hole 1a as shown in FIG. 3A. Then, a part of the edge of the hole 1a forms an edge of the protruding part 11. That is to say, in the first example, the protruding part 11 forms apart of an edge portion of the hole 1a, and is formed at a complicated point in the edge portion of the hole 1a as shown in FIG. 3A.

Then, as shown in FIG. 3A, the tip portion 4a of the suspension strap 4 in a state of suspending the skin material 3 is put through the hole 1a and hooked on the protruding part 11 from a free end of the protruding part 11.

The position variable part 12 is a portion provided in a position (in the configuration shown in FIG. 3A, a position deviated by about 90 degrees) deviated from the protruding part 11 in the edge portion of the hole 1a. Moreover, the position variable part 12 is movable, thereby capable of changing a relative position with respect to the protruding part 11. Concretely, the position variable part 12 according to the first example has a substantially T shape as previously described, and as shown in FIG. 3A and FIG. 3B, has a first extension part 12a which extends linearly and a second extension part 12b which extends in a direction intersecting the first extension part 12a.

The first extension part 12a extends relatively long, and extends out of the edge of the hole 1a. Moreover, a root portion (one end portion in the extending direction) of the first extension part 12a is thinner than other portions. Thereby, the first extension part 12a can rotate with the root portion as a fulcrum. In other words, the position variable part 12 can move like a hinge with the root portion of the first extension part 12a as a fulcrum.

The second extension part 12b extends from a central portion in the extending direction of the first extension part 12a. In addition, that the extension amount (the length in the extending direction) of the second extension part 12b is shorter than the extension amount of the first extension part 12a. On the other hand, the width (the length in the direction intersecting the extending direction) of the second extension part 12b is slightly longer than the width of the first extension part 12a and is longer than the width of the protruding part 11.

The position variable part 12 of the configuration as described above can move like a hinge with the root portion of the first extension part 12a as a fulcrum as previously described. Then, by movement of the position variable part 12, the relative position of the position variable part 12 with respect to the protruding part 11 (hereinafter, simply referred to as the relative position) is changed between a first position shown in FIG. 3B and FIG. 4C and a second position shown in FIG. 3A and FIG. 4A. Here, the first position is a position where the position variable part 12 contacts or engages the protruding part 11. Moreover, the second position is a position where the position variable part 12 is disengaged from the protruding part 11.

In addition, in the first example, as shown in FIG. 3B, the first position is a position where the edge of the position variable part 12 is situated inside the edge of the hole 1a and a free end of the second extension part 12b is adjacent to the free end of the protruding part 11. More specifically, in the first example, the shape of the hole 1a is a shape engageable with the position variable part 12 when the relative position is in the first position. Here, the shape engageable with the position variable part 12 is a shape conforming to the edge of the position variable part 12 when the relative position is in the first position.

Then, when, in the first example, the position variable part 12 is moved to the first position, as shown in FIG. 3B, of the edge of the hole 1a, a large portion except a periphery of the root portion of the first extension part 12a conforms to the edge of the position variable part 12. In other words, the position variable part 12 fits inside the hole 1a when the relative position is in the first position.

Moreover, in the first example, the second position is a position where the free end of the second extension part 12b is separated from the free end of the protruding part 11 and the entire position variable part 12 is dropped out of the hole 1a to the outside as shown in FIG. 4A. Then, when the position variable part 12 is in the second position, the tip portion 4a of the suspension strap 4 is detachable with respect to the protruding part 11. That is, if the position variable part 12 is in the second position, the tip portion 4a of the suspension strap 4 can be easily hooked on the protruding part 11.

On the other hand, when the relative position is in the first position, as shown in FIG. 3B and FIG. 4C, the free end of the second extension part 12b is adjacent to (contacts) the free end of the protruding end 11. Here, as previously described, the width of the second extension part 12b is longer than the width of the protruding part 11.

Therefore, in a state that the free end of the second extension part 12b is adjacent to the free end of the protruding part 11 (in other words, a state that the relative position is in the first position), an end face on the free end side of the second extension part 12b projects further outward than a side surface of the protruding part 11 in a direction intersecting the protruding direction of the protruding part 11. Thereby, if the position variable part 12 is moved to the first position from the second position after hooking the suspension strap 4 on the protruding part 11, the suspension strap 4 is locked to the second extension part 12b even if the suspension strap 4 is intended to be removed from the protruding part 11. That is to say, by holding the relative position in the first position after hooking the suspension strap 4 on the protruding part 11, the state that the suspension strap 4 is hooked on the protruding part 11 can be successfully maintained.

In addition, in the first example, as shown in FIG. 3A, a tip portion (free end portion) of the second extension part 12b is provided with a claw-shaped engagement part 12c. Moreover, in a nearby position (strictly, a position adjacent to the hole 1a in the up and down direction) of the hole 1a in the bottom plate 1, a substantially gate-shaped engaged part 1b is provided. The engaged part 1b is formed in an immediately above position of the hole 1a in the bottom plate 1, and is provided so as to traverse the hole 1a. Then, when the position variable part 12 moves toward the first position, the claw-shaped engagement part 12c enters the hole 1a and engages with the engaged part 1b as shown in FIG. 4B. Strictly, as shown in the same figure, the claw-shaped engagement part 12c is sandwiched between the edge portion of the hole 1a and the engaged part 1b.

As described above, the engagement part 12c engages with the engaged part 1b, and thereby the position variable part 12 is easily held in the first position. As a result, in the first example, the state that the suspension strap 4 is hooked on the protruding part 11 is more easily maintained.

Further, in the first example, when the relative position is in the first position, as shown in FIG. 3B and FIG. 4C, a lower surface 12s of the position variable part 12 is situated on the back side (upper side) of the hole 1a than a lower side opening 1y of the hole 1a in the up and down direction. More specifically, as shown in FIG. 4A, the hole 1a has an upper side opening 1x as a first opening in a position closer to the cushion material 2 and the lower side opening 1y as a second opening further away from the cushion material 2. Moreover, the position variable part 12 has the lower surface 12s directed downward when the relative position is in the first position. The lower surface 12s is a surface which faces the lower side opening 1y when the relative position is in the first position.

Then, when the relative position is in the first position, the lower surface 12s of the position variable part 12 is situated between the upper side opening 1x and the lower side opening 1y in the up and down direction. That is to say, the lower surface 12s of the position variable part 12 in a state of being in the first position is situated on the upper side than a bottom surface of the body portion of the bottom plate 1. According to such a configuration, compared to the configuration in which the lower surface 12s of the position variable part 12 comes out of the hole 1a through the lower side opening 1y, it is possible to make the size of the bottom plate 1 (strictly, the structure for suspending the suspension strap 4) more compact. Moreover, since the lower surface 12s of the position variable part 12 is situated on the upper side than the bottom surface of the body portion of the bottom plate 1, it is possible to avoid the situation where the position variable part 12 accidentally comes out of the hole 1a by an incorrect contact with the position variable part 12. As a result, it is possible to suppress the relative position from deviating from the first position.

Moreover, in the first example, as previously described, the shape of the hole 1a is a shape engageable with the position variable part 12. Such a configuration is advantageous when molding the bottom plate 1 in a die. Concretely, when molding the bottom plate 1 of the first example within a die, the bottom plate 1 is molded such that the hole 1a corresponding to the position variable part 12 is formed around the position variable part 12. According to the bottom plate 1 of such a configuration, without requiring a complicated structure such as a so-called nested structure, it is possible to mold the bottom plate 1 in a die of a relatively simple configuration.

Second Example

Figure 6A:
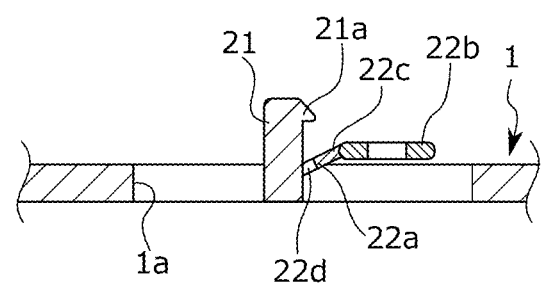
FIG. 6A shows an X-X section of FIG. 5A.
Figure 6B:
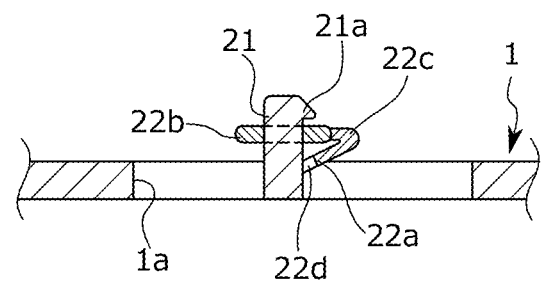
FIG. 6B shows an X-X section of FIG. 5B.

Next, a second example of the structure for hooking the suspension strap 4 will be described with reference to FIG. 5A, FIG. 5B, FIG. 6A, and FIG. 6B. In addition, FIG. 5A and FIG. 5B show a protruding part 21 and a position variable part 22 viewed from a lower side of the bottom plate 1. FIG. 6A shows an X-X section of FIG. 5A, and FIG. 6B shows an X-X section of FIG. 5B.

In the second example, in the bottom plate 1, as the hole 1a for putting the tip portion 4a of the suspension strap 4 therethrough, a circular hole in plan view shown in FIG. 5A and FIG. 5B is formed. Moreover, of the bottom surface of the bottom plate 1, a portion situated aside of the hole 1a is provided with the protruding part 21. Moreover, a portion adjacent to the protruding part 21 is provided with the position variable part 22. The protruding part 21 and the position variable part 22 are provided on the bottom plate 1 with the same uses as the protruding part 11 and the position variable part 12 according to the first example, and are molded integrally with the body portion of the bottom plate 1 when molding the bottom plate 1.

In the second example, the protruding part 21 protrudes downward from the bottom surface of the bottom plate 1. Moreover, on a tip portion of the protruding part 21, a claw-shaped protrusion 21a is formed as shown in FIG. 6A and FIG. 6B. The protrusion 21a protrudes outward from an outer surface of the protruding part 21. In addition, the tip portion 4a of the suspension strap 4 in a state of suspending the skin material 3 is drawn through the hole 1a into the position where the protruding part 21 is arranged, and is hooked on the protruding part 21 (strictly, a portion close to a root than the protrusion 21a).

As shown in FIG. 5A, the position variable part 22 is provided inside a rectangular hole hollowed and penetrated into a rectangular shape in the bottom plate 1. Moreover, the position variable part 22 has a base end part 22a, a mating part 22b, and a bent part 22c. The base end part 22a is a portion extending out of an edge portion of the rectangular hole. The mating part 22b forms a tip portion of the position variable part 22, and in a central portion thereof, a square hole is formed. The bent part 22c is a portion which connects the base end part 22a and the mating part 22b in the position variable part 22. Moreover, the bent part 22c is flexible and capable of being bent.

Then, the position variable part 22 can move by bending the bent part 22c. Concretely, in a state before the bent part 22c is bent, a relative position of the position variable part 22 with respect to the protruding part 21 (hereinafter, simply referred to as the relative position) is in a position deviated from the protruding part 21, concretely, in a position where the edge portion of the position variable part 22 fits inside the rectangular hole as shown in FIG. 5A. Such a position corresponds to a second position in the second example.

On the other hand, in a state that the bent part 22c is bent, the relative position is in a position where the position variable part 22 engages the protruding part 21, concretely, in a position where the mating part 22b fits into the protruding part 21 as shown in FIG. 5B. Such a position corresponds to a first position in the second example.

As described above, in the second example, the position variable part 22 moves toward the first position from the second position by bending the bent part 22c. Then, when the relative position is in the first position, the mating part 22b of the position variable part 22 surrounds the outer surface of the protruding part 21. That is, in a state that the relative position is in the first position, the mating part 22b projects further outward than a side surface of the protruding part 21 in a direction intersecting the protruding direction of the protruding part 21.

By the configuration described above, in the second example, if the position variable part 22 is moved to the first position from the second position after hooking the suspension strap 4 on the protruding part 21, the suspension strap 4 is locked to the mating part 22b even if the suspension strap 4 is intended to be removed from the protruding part 21. That is to say, by holding the relative position in the first position after hooking the suspension strap 4 on the protruding part 21, the state that the suspension strap 4 is hooked on the protruding part 21 can be successfully maintained.

Moreover, as can be seen from FIG. 5B and FIG. 6B, in a state that the mating part 22b fits into the protruding part 21, the claw-shaped protrusion 21a provided on the tip portion of the protruding part 21 protrudes outside an inner edge of the mating part 22b. Thereby, it is possible to adequately maintain the state that the mating part 22b fits into the protruding part 21, that is, the state that the position variable part 22 is in the first position. Thereby, it is possible to more successfully maintain the state that the suspension strap 4 is hooked on the protruding part 21.

Moreover, as shown in FIG. 6A, of the base end part 22a, a generally rectangular through hole 22d is formed in a portion opposed to the claw-shaped protrusion 21a (concretely, a portion in an immediately above position of the protrusion 21a). Providing the through hole 22d is advantageous when molding the bottom plate 1 according to the second example in a die. Concretely, when molding the bottom plate 1 according to the second example within a die, the bottom plate 1 is molded such that the claw-shaped protrusion 21a is provided on the tip portion of the protruding part 21. On the other hand, the bottom plate 1 is molded such that, in the portion opposed to the protrusion 21a, the through hole 22d is formed. According to the bottom plate 1 of such a configuration, without requiring a complicated structure such as a so-called nested structure, it is possible to mold the bottom plate 1 in a die of a relatively simple configuration.

Third Example

Figure 8A:
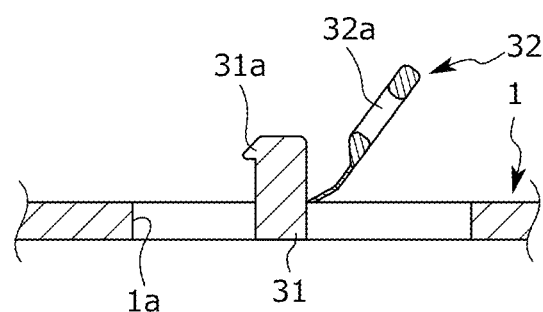
FIG. 8A shows an X-X section of FIG. 7A.
Figure 8B:
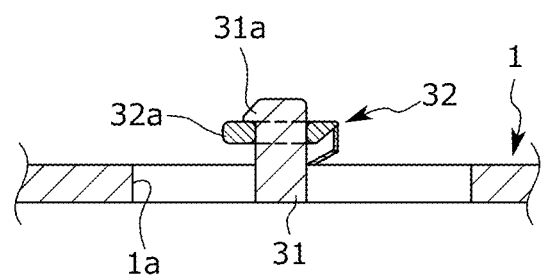
FIG. 8B shows an X-X section of FIG. 7B.

Next, a third example of the structure for hooking the suspension strap 4 will be described with reference to FIG. 7A, FIG. 7B, FIG. 8A, and FIG. 8B. In addition, FIG. 7A and FIG. 7B show a protruding part 31 and a position variable part 32 viewed from a lower side of the bottom plate 1. FIG. 8A shows an X-X section of FIG. 7A, and FIG. 8B shows an X-X section of FIG. 7B.

The configuration of the bottom plate 1 in the third example is common to the configuration of the bottom plate 1 in the second example except for the configuration related to the arrangement position of the position variable part 22. Concretely, as shown in FIG. 7A and FIG. 7B, the substantially square hole 1a is formed in the bottom plate 1, and in a portion situated aside of the hole 1a, the protruding part 31 which protrudes downward is provided. The tip portion 4a of the suspension strap 4 in a state of suspending the skin material 3 is drawn through the hole 1a into the position where the protruding part 31 is arranged, and is hooked on the protruding part 31.

The position variable part 32 extends from a root portion of the protruding part 31. In this regard, the third example is different from the second example. Moreover, as shown in FIG. 7A and FIG. 7B, the position variable part 32 has a mating part 32a at a tip portion thereof. Then, as can be seen from FIG. 7A and FIG. 7B, the position variable part 32 is bent at a midway position thereof, thereby moving toward a first position (a position shown in FIG. 7B and FIG. 8B) from a second position (a position shown in FIG. 7A and FIG. 8A).

Then, in a state that a relative position of the position variable part 32 with respect to the protruding part 31 is in the first position, the mating part 32a fits into the protruding part 31. That is to say, when the relative position is in the first position, the mating part 32a surrounds an outer surface of the protruding part 31, and, in other words, the mating part 32a projects further outward than a side surface of the protruding part 31 in a direction intersecting the protruding direction of the protruding part 31.

By the configuration described above, also in the third example, by holding the relative position in the first position after hooking the suspension strap 4 on the protruding part 31, the state that the suspension strap 4 is hooked on the protruding part 31 can be successfully maintained.

Moreover, as can be seen from FIG. 7B and FIG. 8B, in a state that the mating part 32a fits into the protruding part 31, a claw-shaped protrusion 31a provided on a tip portion of the protruding part 31 protrudes outside an inner edge of the mating part 32a. Thereby, it is possible to adequately maintain the state that the mating part 32a fits into the protruding part 31, that is, the state that the relative position is in the first position. Thereby, it is possible to more successfully maintain the state that the suspension strap 4 is hooked on the protruding part 31.

Fourth Example

Figure 10:
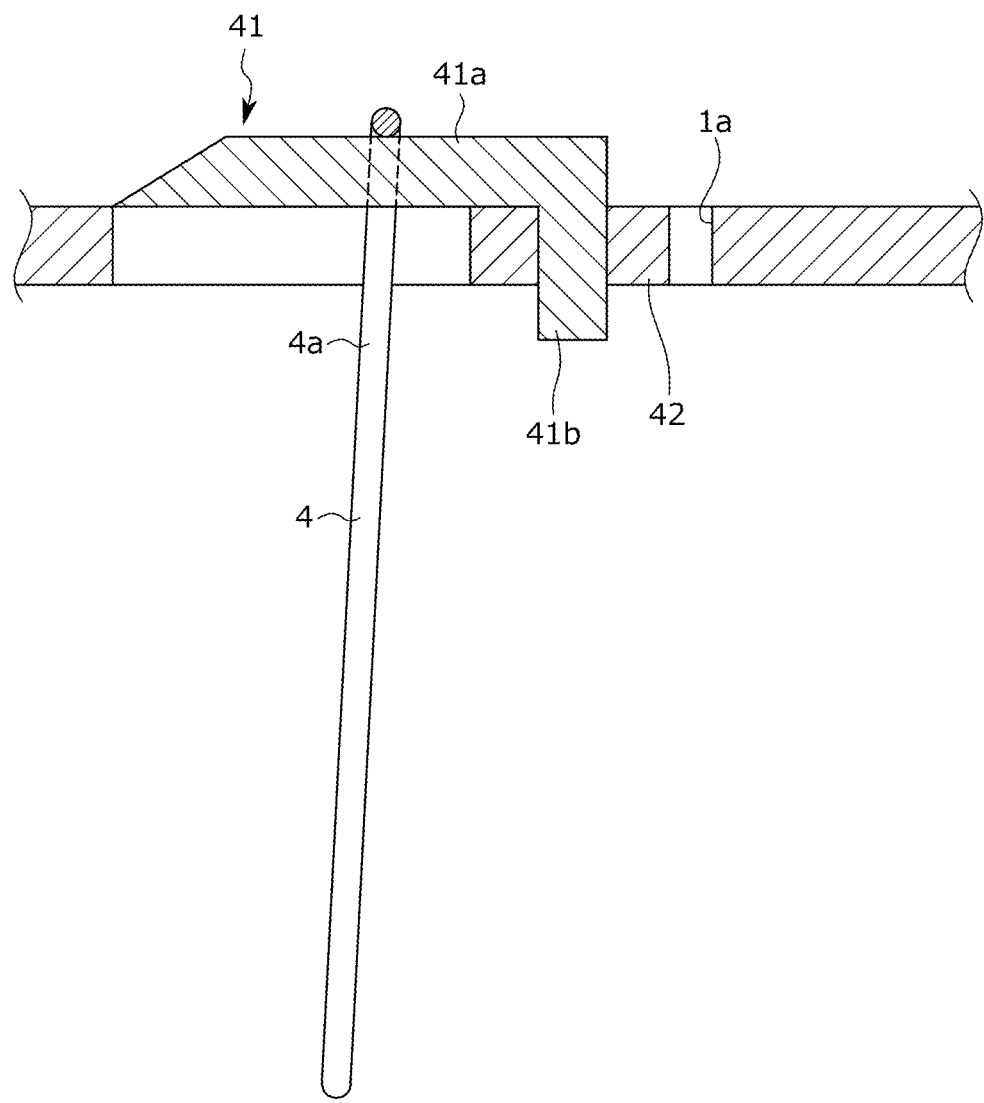
FIG. 10 shows an X-X section of FIG. 9.

Next, a fourth example of the structure for hooking the suspension strap 4 will be described with reference to FIG. 9 and FIG. 10. In addition, FIG. 9 shows a protruding part 41 and a position variable part 42 viewed from a lower side of the bottom plate 1. FIG. 10 shows an X-X section of FIG. 9.

In the fourth example, around the rectangular hole 1a formed in the bottom plate 1, a movable protruding part 41 and a fixed (immovable) position variable part 42 are provided. That is, the position variable part 42 according to the fourth example is changed in a relative position with respect to the protruding part 41 associated with the movement of the protruding part 41. In addition, the protruding part 41 and the position variable part 42 are molded integrally with the body portion of the bottom plate 1 when molding the bottom plate 1. Hereinafter, each configuration of the protruding part 41 and the position variable part 42 according to the fourth example will be described.

The protruding part 41 protrudes from the edge portion of the hole 1a, and has a tip portion formed into a substantially E shape (strictly, the E shape rotated by about 90 degrees) as shown in FIG. 9. Then, as shown in the same figure, of the substantially E-shaped tip portion, on a portion (hereinafter, protruding part central portion 41a) linearly extending in a middle position, the tip portion 4a of the suspension strap 4 in a state of suspending the skin material 3 is hooked.

Moreover, a root portion (a portion adjacent to the edge portion of the hole 1a) of the protruding part 41 is thinner than other portions. Thereby, the protruding part 41 can rotate with the root portion as a fulcrum. In other words, the protruding part 41 can move like a hinge with the root portion thereof as a fulcrum.

The position variable part 42 is in a nearby position (strictly, a position adjacent to the hole 1a in the up and down direction) of the hole 1a in the bottom plate 1, and is provided so as to traverse the hole 1a. Then, as previously described, in the fourth example, while the position variable part 42 is immovable, the protruding part 41 is movable. Therefore, in the fourth example, the protruding part 41 moves like a hinge, thereby a relative position of the position variable part 42 with respect to the protruding part 41 (hereinafter, simply referred to as the relative position) is changed.

More specifically, by the movement of the protruding part 41, the relative position is changed between a first position and a second position. In the fourth example, the first position is a position where the protruding part central portion 41*a* contacts a lower surface of the position variable part 42 as shown in FIG. 9 and FIG. 10. In addition, in the fourth example, when the relative position is in the first position, as shown in FIG. 9 and FIG. 10, a part of the protruding part 41 sticks out of the hole 1*a* through the lower side opening 1*y* of the hole 1*a*.

Moreover, the second position is a position where the position variable part 42 is dropped off the protruding part 41, strictly, a position where the entire protruding part 41 is dropped out of the hole 1*a* to the outside.

When the relative position is in the first position, as shown in FIG. 9, the protruding part central portion 41*a* abuts on the lower surface of the position variable part 42. Here, the width of the lower surface of the position variable part 42 is sufficiently long with respect to the width of the protruding part central portion 41*a*. Therefore, in a state that the relative position is in the first position, the lower surface of the position variable part 42 projects further outward than a side surface of the protruding part central portion 41*a* in a direction intersecting the protruding direction of the protruding part 41 (strictly, the protruding part central portion 41*a*). Thereby, if the protruding part 41 is moved so as to approach the position variable part 42 to change the relative position to the first position from the second position after hooking the suspension strap 4 on the protruding part central portion 41*a*, the state that the suspension strap 4 is hooked on the protruding part 41 can be successfully maintained.

In addition, in the fourth example, as shown in FIG. 10, a free end portion of the protruding part central portion 41*a* is provided with a claw-shaped engagement part 41*b*. Moreover, in the position variable part 42, a mating hole (not shown) is formed. Then, if the protruding part 41 is moved so as to approach the position variable part 42 and the relative position is changed to the first position, the claw-shaped engagement part 41*b* enters the above-described mating hole. Thereby, the relative position is easily held in the first position, and consequently, the state that the suspension strap 4 is hooked on the protruding part 41 is more easily maintained.

What is claimed is:

1. A conveyance seat comprising: a cushion material, a bottom wall which supports the cushion material, a skin material which covers the cushion material, and a linear member used for suspending the skin material, wherein
   the bottom wall is provided with a protruding part on which the linear member is hooked when suspending the skin material, and a position variable part capable of changing a relative position with respect to the protruding part, and
   the relative position can be changed between a first position where the position variable part contacts or engages the protruding part and a second position where the position variable part is disengaged from the protruding part.
2. The conveyance seat according to claim 1, wherein in a state that the relative position is in the first position, at least a part of the position variable part projects further outward than a side surface of the protruding part in a direction intersecting the protruding direction of the protruding part.
3. The conveyance seat according to claim 2, wherein
   a hole is provided in the bottom wall, the protruding part is situated inside the hole, and
   a part of an edge of the hole forms an edge of the protruding part.
4. The conveyance seat according to claim 3, wherein
   the shape of the hole is a shape engageable with the position variable part when the relative position is in the first position, and
   the position variable part is adjacent to the protruding part in a state that an edge of the position variable part is situated inside the edge of the hole when the relative position is in the first position.
5. The conveyance seat according to claim 4, wherein
   a tip portion of the position variable part is provided with a claw-shaped engagement part,
   the bottom wall is provided with an engaged part at a position adjacent to the hole, and
   when the relative position is in the first position, the engagement part enters the hole and engages with the engaged part.
6. The conveyance seat according to claim 3, wherein
   the position variable part has a first extension part which extends linearly and a second extension part which extends in a direction intersecting the first extension part, and is capable of rotating with one end portion of the first extension part in the extending direction of the first extension part as a fulcrum, and
   when the relative position is in the first position, a free end of the second extension part is adjacent to a free end of the protruding part.
7. The conveyance seat according to claim 3, wherein
   the hole has a first opening which is in a position closer to the cushion material and a second opening further away from the cushion material,
   the position variable part has a surface which faces the second opening when the relative position is in the first position, and
   the surface is situated between the first opening and the second opening when the relative position is in the first position.
8. The conveyance seat according to claim 2, wherein
   the position variable part has a mating part which fits into the protruding part when the relative position is in the first position, and
   a tip portion of the protruding part is provided with a claw-shaped protrusion which protrudes outside an inner edge of the mating part in a state that the mating part fits into the protruding part.
9. The conveyance seat according to claim 8, wherein
   the bottom wall is a resin molded article,
   the position variable part has a base end part, the mating part, and a bent part which connects the base end part and the mating part and is capable of being bent, and is moved toward the first position from the second position by bending the bent part, and
   of the base end part, a through hole is provided in a portion opposed to the protrusion.
10. The conveyance seat according to claim 1, wherein
    the linear member is a suspension strap whose tip portion is ring-shaped, and on the protruding part, the tip portion of the suspension strap is hooked.

* * * * *